(No Model.)
J. MANSON.
STUMP EXTRACTOR.
No. 427,588. Patented May 13, 1890.
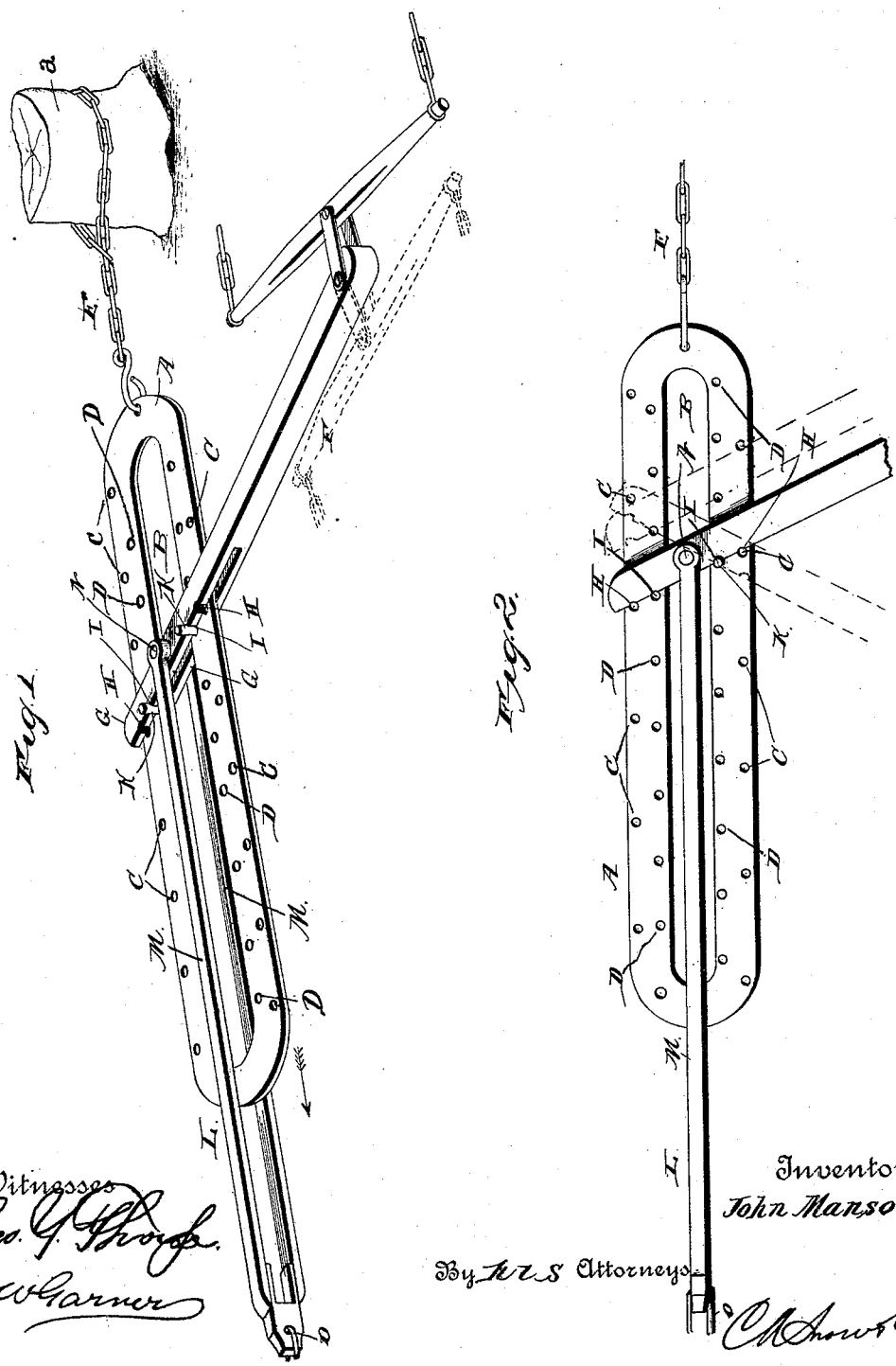
Witnesses
Inventor
John Manson.
By his Attorneys

UNITED STATES PATENT OFFICE.

JOHN MANSON, OF NORTH BLOOMFIELD, CALIFORNIA.

STUMP-EXTRACTOR.

SPECIFICATION forming part of Letters Patent No. 427,588, dated May 13, 1890.

Application filed November 27, 1888. Serial No. 292,014. (No model.)

*To all whom it may concern:*

Be it known that I, JOHN MANSON, a citizen of the United States, residing at North Bloomfield, in the county of Nevada and State of California, have invented a new and useful Improvement in Stump-Extractors, of which the following is a specification.

My invention relates to an improvement in stump-extractors; and it consists in the peculiar construction and combination of devices that will be more fully set forth hereinafter, and particularly pointed out in the claim.

In the accompanying drawings, Figure 1 is a perspective view of a stump-extractor embodying my improvement, showing the same arranged in position for use. Fig. 2 is a top plan view of the same, illustrating by dotted lines the mode of operating the stump-extractor.

A represents a link or frame of suitable length and width, which is made of iron or steel, and is provided with a longitudinal central opening B to render it as light as possible, with a due regard to strength. In the parallel sides of the frame are arranged two sets of openings C D, at suitable and regular distances apart, the openings C being nearer the outer side of the frame, and the openings D being nearer the central opening B thereof and nearer to each other than the others. To one end of the frame A is secured a chain E, which is adapted to be attached to the stump *a* that is to be pulled.

F represents a lever of suitable length, which has its inner end forked or bifurcated, and thereby provided with a pair of arms G, which are adapted to extend transversely over the frame A on the upper and lower sides thereof. The said arms G are provided in one edge with semicircular recesses or notches H I, which are adapted to register, respectively, with the openings C D when the lever is operated in the manner to be hereinafter described.

K K are pins which are inserted in two of the openings C or in two of the openings D to engage the two notches H or the two notches I, respectively.

L represents a clevis having a pair of arms M, that are about equal in length to the link or frame A. The inner ends of the said arms are pivoted on opposite sides of the arms G of lever F at a point midway between the recesses or notches I by a pin or bolt N. The outer end of the clevis is provided with a chain O, which is adapted to be attached to a standing tree or to a post or stake driven in the ground, or to any other suitable anchoring device.

The pins K are shifted alternately from one opening to another step by step throughout the entire length of the link, and are caused to operate alternately as fulcrums for the lever F, the latter being moved first in one direction and then in the contrary direction alternately by a team of horses hitched to one end thereof, thereby causing the frame or link to be drawn in the direction indicated by the arrow and to pull the stump out of the ground. It will thus be seen that the lever may be turned about one pin as a fulcrum, the second pin moved forward, and the lever turned about that pin before the first is removed, and this operation is continued until the stump is torn from its seat. Should the traces or the harness break at any time during the turning of the lever, the second pin will act as a stop to prevent the sweep being drawn out of position.

I am aware that pins have heretofore been used in an analogous device which were inserted through holes in the lever and framework; but one of such pins must be totally removed before the lever can be turned; hence I consider notches preferable.

When the pins K are alternately inserted in the inner series of openings D and caused to engage the notches I of the lever, a maximum degree of leverage is exerted, and when the pins are alternately inserted in the outer series of openings C and caused to engage the notches H a minimum degree of leverage is exerted and the speed with which the device can be operated correspondingly increased; hence if the stump is a small one, necessitating but little power to extract it, the outer series of holes can be used and the operation accomplished in haste, whereas if it be large and strong the inner series can be used, and a lever with more power will result.

Having thus described my invention, I claim—

In a stump-extractor, the combination, with a horizontal slotted link the integral sides of which are each provided with two separate series of perforations, those near the outer edges being spaced farther apart than those near the center, for the purpose set forth, and a grappling-chain connected to one end of said link, of a fastening-chain, a clevis connected at its outer end thereto and having longitudinal horizontal arms embracing said link, a bifurcated lever embracing said link and to which the inner end of the clevis is pivoted, the operating edge of said lever at points equidistant from said pivot having two inner and two outer notches, and two pins removably seated in certain of the holes in the same series at each side of the link, the pins being moved as the lever is operated, substantially as described.

In testimony that I claim the foregoing as my own I have hereto affixed my signature in presence of two witnesses.

JOHN MANSON.

Witnesses:
 THOS. WOON,
 JAMES B. MCKINNEY.